United States Patent [19]
Huang et al.

[11] Patent Number: 5,431,889
[45] Date of Patent: Jul. 11, 1995

[54] HIGH TEMPERATURE AND HIGH PRESSURE REACTION PROCESS AND APPARATUS

[76] Inventors: He Huang, 17-C O'Daniel Ave., Newark, Del. 19711; William H. Calkins, 118 Cambridge Dr., Wilmington, Del. 19803

[21] Appl. No.: 251,341

[22] Filed: May 31, 1994

[51] Int. Cl.⁶ .............................................. F28D 21/00
[52] U.S. Cl. .................................... 422/198; 208/408; 422/202; 422/205; 422/224
[58] Field of Search ................ 422/139, 198, 202, 244, 422/205, 224; 208/408, 415, 418, 428, 431; 423/DIG. 6, DIG. 9, DIG. 16

[56] References Cited

PUBLICATIONS

George P. Curran et al., I & E C Process Design and Development vol. 5, No. 2, Apr. 1967, 166-73.
Richard C. Neavel, Fuel, 1976, vol. 55, Jul., 237-241.
William D. Provine et al., Ind. Eng. Chem. Res. 1992, 31, 1170-1176.
Jon R. Gibbins et al., 1991, vol. 70, Aug., 909-915.

*Primary Examiner*—Robert J. Warden
*Assistant Examiner*—Krisanne M. Thornton
*Attorney, Agent, or Firm*—Donald W. Huntley

[57] ABSTRACT

A process and apparatus for carrying out reactions at elevated temperatures and pressures which minimizes the heat-up and cool-down times by rapid transport of the reactants using pressurized gas through a preheater to a preheated reactor, agitating the reaction mixture and discharging the reactants with high pressure gas through a precooler.

19 Claims, 2 Drawing Sheets

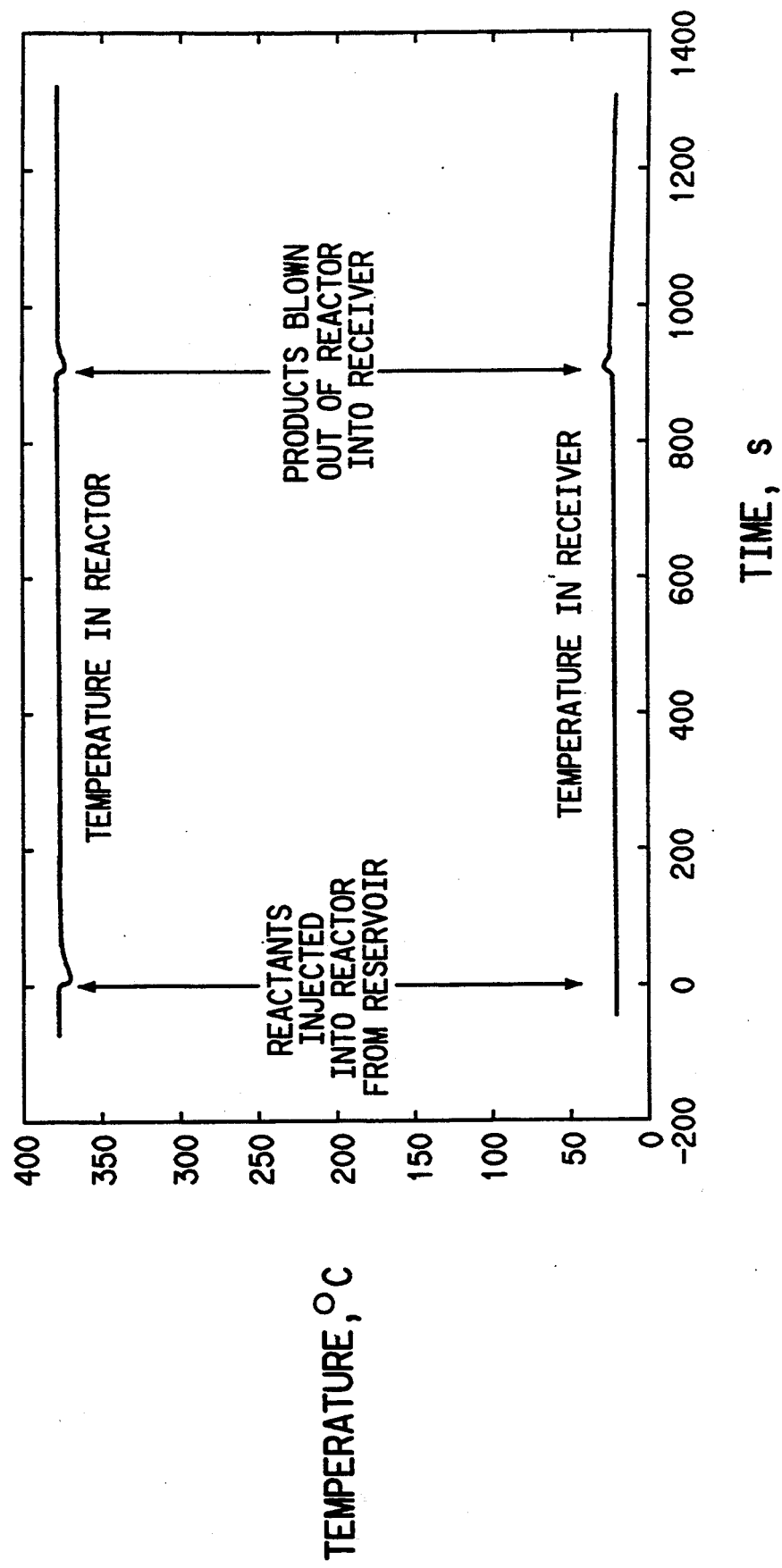

HIGH TEMPERATURE AND HIGH PRESSURE REACTION PROCESS AND APPARATUS

BACKGROUND OF THE INVENTION

In many high-pressure and high-temperature reactions, important information concerning the control of chemical and physical processes can be obtained through study of the reactions at the early stages, before complicating secondary reactions occur. This requires bringing the system up to the reaction temperature and pressure before any substantial reaction takes place, and, similarly, quickly reducing the temperature to ambient after the reaction is completed to the desired extent. Such study also requires agitation for achieving uniform concentration and temperature of the reactants within the reaction vessel.

Previous apparatus for such studies involved tubing bombs or autoclaves, which require long heating and cooling times relative to the reaction times themselves. Such long heat up and cool down times make study of short reaction times difficult, and obtaining accurate kinetic information in such equipment is not possible.

Typical reactor systems are agitated by either stirring or shaking, which requires complicated equipment, which is difficult to control, especially on small laboratory scales. Accordingly, a need exists for reaction apparatus which permits study of high-temperature reactions without the interference of long heating and cooling periods or complex agitation apparatus.

SUMMARY OF THE INVENTION

The instant invention provides a process and apparatus for carrying out high temperature and high pressure reactions in which the reactants are brought to reaction temperature in a short period to permit study of the reaction substantially without interfering secondary reactions.

Specifically, the present invention provides a process for carrying out a reaction at elevated temperatures and pressures comprising:
(a) preheating an empty preheater and a reaction vessel connected to the preheater substantially to a predetermined reaction temperature;
(b) introducing at least one reactant into the preheater, heating each reactant to substantially the predetermined reaction temperature, and transferring each reactant from the preheater to the reaction vessel by pressurized gas in less than about ten seconds;
(c) agitating the resulting reaction mixture in the reaction vessel;
(d) cooling an empty precooler and a product receiver connected to the precooler to a desired lower temperature; and
(e) transferring the reaction mixture from the reaction vessel through the precooler and to the product receiver in less than about ten seconds, to cool the reaction mixture to the lower temperature.

The instant invention further provides an apparatus for carrying out a reaction at elevated temperatures and pressures comprising:
(a) means for preheating an empty preheater and a reaction vessel connected to the preheater substantially to a predetermined reaction temperature;
(b) means for introducing at least one reactant into the preheater, heating each reactant to substantially the predetermined reaction temperature, and transferring each preheated reactant from the preheater to the reaction vessel by pressurized gas in less than about ten seconds;
(c) means for agitating the resulting reaction mixture in the reaction vessel;
(d) means for cooling an empty precooler and a product receiver connected to the precooler to a desired lower temperature; and
(e) means for transferring the reaction mixture from the reaction vessel through the precooler and to the product receiver in less than about ten seconds, to cool the reaction mixture to the lower temperature.

BRIEF DESCRIPTION OF THE DRAWINGS

FIG. 2 is a temperature profile of a reaction mixture processed according to the present invention.

DETAILED DESCRIPTION OF THE INVENTION

Figure 1:
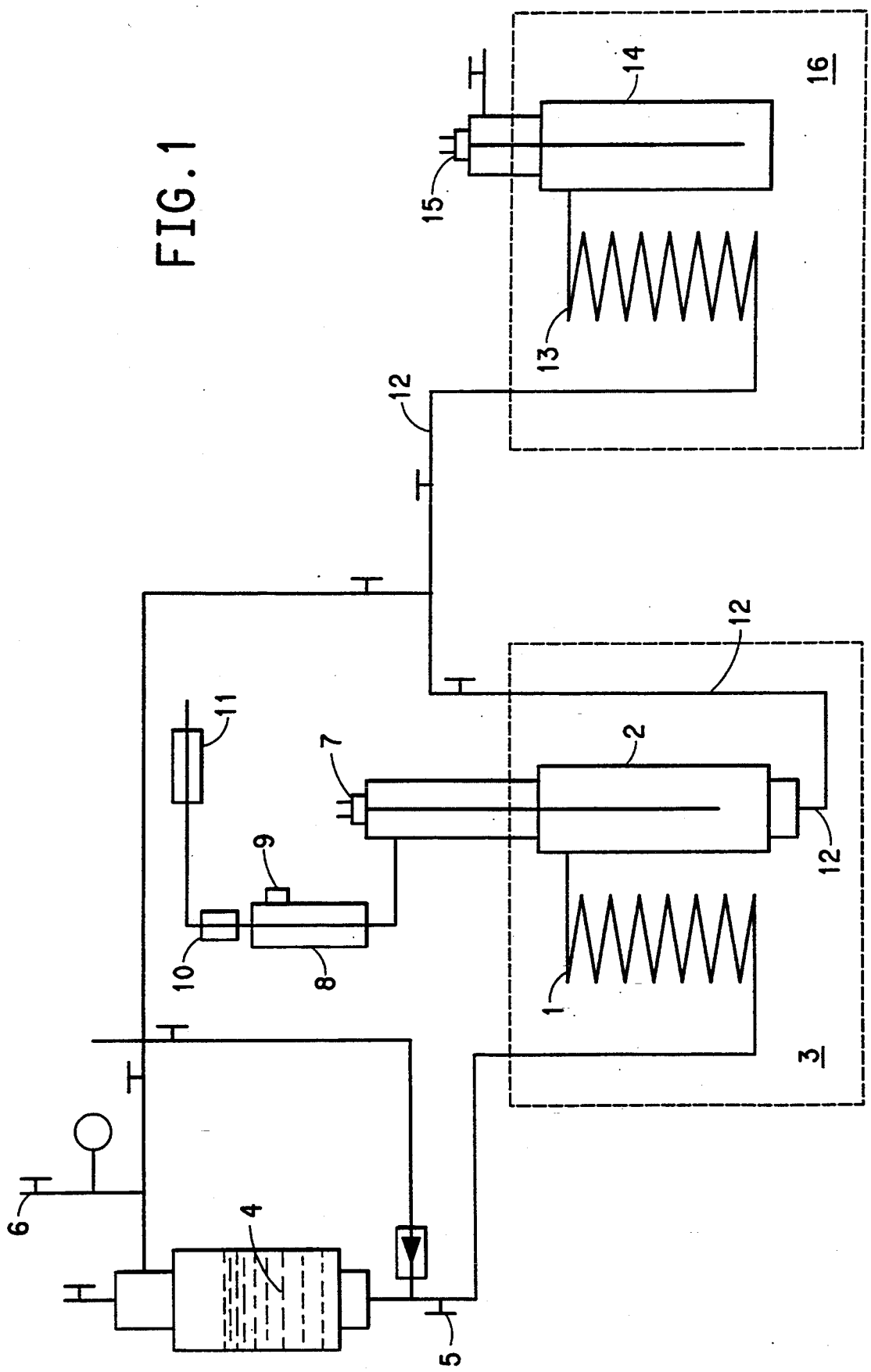
FIG. 1 is a schematic representation of an apparatus of the present invention.

The present invention can be more fully understood by reference to FIG. 1, which is a schematic representation of an apparatus of the present invention. There, empty preheater 1 and reaction vessel or reactor 2 are both immersed in sand bath 3 which is maintained at a predetermined reaction temperature. To maximize the heat transfer between the processed stream and the preheater, the preheater is in the form of coiled tubing. However, a wide variety of configurations can be used to maximize the heat transfer, as will be evident to those skilled in the art. In operation, each reactant is passed from reactant reservoir 4 through valve 5, pressurized by a gas introduced at the top of the reactant reservoir through valving apparatus 6. The reactor is equipped with thermocouple 7 and, condenser 8 equipped with cooling water through inlet 9. At the top of the condenser, a disengaging chamber 10 with let-down valve and gas-flow meter 11 is provided.

In the operation of this apparatus, the reaction mixture is agitated by the inflow of gas from the bottom of the reactor through inlet 12. This is provided through appropriate valving along the gas line system. After the desired residence time within the reaction vessel, the gas-flow to the bottom of the reaction vessel is stopped through the provided valving, and the reaction mixture is removed from the reaction vessel by gas pressure through the preheater, forcing the reaction mixture through exit line 12 into precooler 13 and then into product receiver 14, which is equipped with a thermocouple 15. Both the precooler and the product receiver are immersed in water bath 16 or other cooling media.

The particular gas used for the agitating gas and the transfer from one element of the present apparatus to another can vary widely, and can include any gas which is either reactive in the desired reaction or inert to the reactants. For example, nitrogen, argon, helium, or other inert gas can be used. Hydrogen, carbon monoxide, carbon dioxide, or other reactive gas can also be used depending on the desired reaction. Steam can be used, and will be inert or reactive depending on the reactants in the system. Nitrogen and hydrogen are preferred inert and reactive gases, respectively, for many reaction systems. The gas is typically maintained at a pressure of at least about 500 psig, and normally about from 500 to 2500 psig, although the specific pressure used will necessarily vary with the desired transfer speed and the particular apparatus construction used. The pressure used in the present invention can vary widely within the indicated ranges. In general, higher pressures will result in higher speed of transfer. The higher speed of transfer is also accompanied by a more turbulent flow within the preheater or precooler which, in turn, facilitates a high rate of heat transfer.

The transfer gas, which may be a reactant, is preferably also used to agitate the reaction mixture in the course of the reaction. This is preferably carried out by introducing the gas into the reaction mixture from the bottom of the reaction vessel. For this purpose, a reversal of the gas flow through the system is particularly convenient, by the provision of appropriate valving within the pressurized gas supply.

When the reaction has proceeded for a desired period of time, the reaction mixture within the reactor is driven, using the pressurized gas, first into the precooler and than into the product receiver. The transfer should be carried out in a period of less than about 10 seconds. To maximize the benefits of the present invention, transfer is preferably carried out in less than about 1 second, and a transfer time of about 0.3 seconds or less has been found to be particularly satisfactory.

The empty preheater and the reactor are both preheated to substantially a predetermined reaction temperature. It is generally convenient to preheat both the preheater as well as the reactor in the same medium. The preheating medium can conveniently be a fluidized sand bath or a molten salt bath. Still other suitable heat sources will be readily apparent to those skilled in the art.

A wide variety of cooling baths for the precooler as well as the product receiver can be used in the present invention. As with the preheater and the reactor, it is generally necessary to precool both the precooler and product receiver in the same medium. Water has been found to be most convenient, but other cooling media, such as ice-water, liquid nitrogen, liquid helium and dry ice-acetone, may be selected to suit a particular application. In some cases, even steam or other higher temperature media can be used as a cooling medium when cooling to above ambient temperature is necessary.

Prior to introduction of the reactant or reactants into the apparatus of the present invention, it can optionally be heated to above ambient temperature before being forced into the preheater. The present invention, with the combination of heating and cooling elements, permits carrying out a reaction with a minimization of the time necessary to bring the reactants up to reaction temperature and back down to ambient or other quenching temperature, thus separating the thermal characteristics of the reaction itself from the heating and cooling elements of the system.

The reactor system can be cleaned in place by a series of solvent washes. The number of washes and type of solvent used are selected based on the materials and processes being used in the system.

The wash effectiveness can be monitored by analysis of the wash streams. For example, the homogeneous ternary mixture of dibenzyl ether (DBE), biphenyl (BP), and tetralin can be washed out with methylene chloride and the washings analyzed by gas chromatograph. For this ternary mixture, at least five 30 cm$^3$ washes are typically used to achieve above 99% recovery of the process stream.

For hetrogeneous mixtures, such as those involved in coal liquefaction and coal-derived vacuum resid hydroprocessing, the wash effectiveness can be followed through analysis of both the soluble reactant concentration and the particulate concentration in the wash streams. Tetralin or liquefaction recycle solvent can be used in these cases and at least five 30 cm$^3$ washes are generally required to obtain about 99% sample recovery.

The present apparatus can be used for the study of a wide variety of reactions including, for example, hydroprocessing of coal-derived resids, reactions involved in coal liquefaction and other high-pressure, high-temperature organic or inorganic systems where small scale experiments for kinetic measurements are required. It can be particularly important and applicable to the process where its selectivity is highly sensitive to the temperature-time history.

The present invention is further illustrated in the following specific example.

EXAMPLE

A batch reactor was constructed substantially as shown in FIG. 1. The reactor was ¾" 316 stainless steel tubing with wall thickness of 0.433" and approximately 12" long. The preheater consisted of a coiled ¼" 316 stainless steel tubing with wall thickness at 0.035" and about 21 feet long. Both the preheater and the reactor were immersed in a sand bath and brought up to the desired reaction temperature prior to the start of the reaction. Using nitrogen gas maintained at 1000 psig, the reaction mixture consisting of 89% tetralin, 1% biphenyl, and 10% dibenzylether at ambient temperature was driven into the reactor from a small blow case through the preheater. The temperature of the reactants (ca. 30 g) approached the desired reaction temperature within 5°-8° C. upon entering the reactor. The rapid response and stable temperature profile was due to the small quantity of the reaction mixture relative to the massive preheater and the thermal transient which is entirely focused on the reactants as they proceed through the preheater.

The reaction mixture was then agitated by gas bubbles injected through the slurry from the bottom of the reactor. The degree of agitation was controlled by the exit gas flow rate from the top of the reactor. If a reactant gas was used (e.g., H$_2$), the gas bubbles provided high contact or interfacial surface area between the gas and the liquid or slurry reaction mixture. At a selected time, the reactor contents were driven out of the reactor with high pressure gas through a precooler of the same tubing as the preheater and 21 feet long, and then into a product receiver. Both receiver and precooler were immersed in a water bath. Cooling of the product mixture to about 25° C. was achieved upon entering the receiver.

The heating bath was a Techne IFB-52 industrial fluidized sand bath, which maintained a reaction temperature of ±2° C. The 30 cm$^3$ reactor is capable of containing 17 MPa (2500 psig) pressure up to 550° C. The tubing used for the precooler was identical to the preheater. Since a gas was bubbled through the reaction mixture under pressure for agitation and out through a let-down valve, a small water-cooled condenser above the reactor was necessary to avoid loss of solvent or other low boiling components. For operability, a disengaging space above the condenser before the let-down valve was also used to prevent plugging.

A temperature-time profile for the mixture of 89% tetralin, 1% biphenyl, and 10% dibenzylether is shown in FIG. 2. At the time of injection, the reactor temperature dropped 5°–8° C., but it recovered to the sand bath temperature within 30 seconds. This temperature drop can be reduced by longer preheater tubing.

In a reactor run, there was a loss of material in the preheater during the injection process and in the reactor and precooler when the reactants were driven from the reactor. The overall recovery of material from a reactor run depends on the surface areas of these equipment pieces, since surface holds up liquid by wetting. Thus, the longer the preheater, the smaller the temperature drop on injection, and the lower the overall sample recovery. This necessitates a design trade off between the temperature drop on injection and the degree of overall material recovery from the reactor. The viscosity or fluidity of the sample stream also influences the recovery, which varied from 65 to 90%.

We claim:

1. A process for carrying out a reaction at elevated temperatures and pressures comprising:
   (a) preheating an empty preheater and a reaction vessel connected to the preheater substantially to a predetermined reaction temperature;
   (b) introducing at least one reactant into the preheater, heating said at least one reactant to substantially the predetermined reaction temperature, and transferring said at least one preheated reactant from the preheater to the reaction vessel to produce a reaction mixture by pressurized gas in less than about ten seconds;
   (c) agitating the resulting reaction mixture in the reaction vessel;
   (d) cooling an empty precooler and a product receiver connected to the precooler to a predetermined temperature lower than said predetermined reaction temperature; and
   (e) transferring the reaction mixture from the reaction vessel through the precooler and to the product receiver in less than about ten seconds, to cool the reaction mixture to the predetermined lower temperature.

2. A process of claim 1 wherein the gas is pressurized to at least about 500 psig.

3. A process of claim 2 wherein the gas is pressurized to about from 500 to 2500 psig.

4. A process of claim 1 wherein the reaction mixture is agitated in the reaction vessel by passing gas therethrough.

5. A process of claim 4 wherein the agitating gas is introduced into the reaction mixture from the bottom of the reaction vessel.

6. A process of claim 4 wherein the agitating gas is a gas reactive with said at least one reactant.

7. A process of claim 6 wherein the agitating gas consists essentially of hydrogen.

8. A process of claim 4 wherein the agitating gas is a gas non-reactive with said at least one reactant.

9. A process of claim 8 wherein the agitating gas consists essentially of nitrogen.

10. A process of claim 1 wherein the reaction mixture is transferred from the preheater to the reaction vessel in less than about one second.

11. A process of claim 10 wherein the reaction mixture is transferred from the preheater to the reaction vessel in less than about 0.3 seconds.

12. A process of claim 1 wherein the reaction mixture is transferred from the reaction vessel to the product receiver in less than about one second.

13. A process of claim 12 wherein the reaction mixture is transferred from the reaction vessel to the product receiver in less than about 0.3 seconds.

14. A process of claim 1 wherein the preheater and the reaction vessel are maintained at the predetermined temperature by a fluidized sand bath.

15. A process of claim 1 wherein the precooler and the product receiver are maintained at the predetermined temperature by a water bath.

16. An apparatus for carrying out a reaction at elevated temperatures and pressures comprising:
   (a) a preheater;
   (b) a reaction vessel;
   (c) a precooler;
   (d) a product receiver;
   (e) means for fluidly connecting said preheater, said reaction vessel, said precooler and said product receiver, respectively;
   (f) means for preheating said empty preheater and said reaction vessel connected to the preheater substantially to a predetermined reaction temperature;
   (g) means for introducing at least one reactant into the preheater, heating said at least one reactant to substantially the predetermined reaction temperature, and transferring said at least one reactant from the preheater to the reaction vessel to produce a reaction mixture by pressurized gas in less than about ten seconds;
   (h) means for agitating the resulting reaction mixture in the reaction vessel;
   (i) means for cooling said empty precooler and said product receiver connected to the precooler to a predetermined temperature lower than said predetermined reaction temperature; and
   (j) means for transferring the reaction mixture from the reaction vessel through the precooler and to the product receiver in less than about ten seconds, to cool the reaction mixture to the lower temperature.

17. An apparatus of claim 16 wherein the means for preheating consists of a fluidized sand bath.

18. An apparatus of claim 16 wherein the means for cooling the precooler and product receiver consists of a water bath.

19. An apparatus of claim 16 wherein the means for agitating the reaction mixture comprises a supply of pressurized gas and fluid connection of the gas to the bottom of the reaction vessel.

* * * * *